(12) United States Patent
Sempel

(10) Patent No.: US 6,516,919 B1
(45) Date of Patent: Feb. 11, 2003

(54) COMBINATION TREE STAND AND GAME CART

(76) Inventor: Todd Sempel, 5705 - 259th St., Wyoming, MN (US) 55092

( * ) Notice: Subject to any disclaimer, the term of this patent is extended or adjusted under 35 U.S.C. 154(b) by 0 days.

(21) Appl. No.: 10/117,629

(22) Filed: Apr. 5, 2002

Related U.S. Application Data

(63) Continuation-in-part of application No. 09/779,102, filed on Feb. 7, 2001, now abandoned.

(51) Int. Cl.[7] .................................................. A45F 3/26
(52) U.S. Cl. ......................................... 182/20; 182/187
(58) Field of Search ........................... 182/20, 187, 188, 182/135, 136

(56) References Cited

U.S. PATENT DOCUMENTS

| | | | | |
|---|---|---|---|---|
| 4,782,918 A | * | 11/1988 | Brunner | 182/187 |
| 4,936,416 A | * | 6/1990 | Garon | 182/187 |
| 5,297,656 A | * | 3/1994 | Amaker | 182/187 |
| 5,562,180 A | * | 10/1996 | Herzog | 182/187 |
| 5,887,676 A | * | 3/1999 | Harbon | 182/20 |

* cited by examiner

*Primary Examiner*—Alvin Chin-Shue
(74) *Attorney, Agent, or Firm*—Nikolai & Mersereau, P.A.

(57) ABSTRACT

A combination cart and tree stand for use by hunters. The cart has detachable wheels and the wheel carriage folds up when using the device as a tree stand or for storage. The wheels can be removed from the wheel carriage and attached to the arms of the stand while the arms are belted to a tree. The arms of the cart easily pivot 90 degrees to become the vertical frame of the tree stand by removing pins holding the arms. The tree stand is attached to a tree by a T screw and a belt adjustably tightened around the tree. The tree stand has a tiltable seat, which has an adjustable length arm to extend the length of the cart for the size of game to be placed on the cart and for adjusting the height of the seat on the tree stand.

20 Claims, 3 Drawing Sheets

COMBINATION TREE STAND AND GAME CART

This is a Continuation-In-Part of Application Ser. No. 09/779,102 filed Feb. 7, 2001, now abandoned.

BACKGROUND OF THE INVENTION

1. Field of the Invention

This invention relates to a combination of a wheeled cart and tree stand used principally by deer hunters.

2. Description of the Related Art

There are several different combination wheeled deer cart and tree stands, all of which have different features with different benefits and drawbacks.

The Shoestock, Sr. patent, U.S. Pat. No. 5,433,291 has a cart with two portions which come apart to form a tree stand with first and second frame portions. The lower portion is attached to the tree to form a step for reaching the second portion. Both portions are attached to the tree with frame members indented to receive the curved surface of a tree. A top frame member and a bottom frame member on either side of the tree cooperate to secure the frame to the tree. It appears to be a cumbersome and difficult method for attaching the tree stand to the tree and for assembling and disassembling the cart.

The Michno patent U.S. Pat No. 5,492,196, shows a cart with a folding chair on a frame. A belt attached to a hook at the top of the frame encircles the tree. The folding chair has a platform it rests on which engages the tree.

The Beardslee, Jr. patent U.S. Pat No. 5,624,008, shows a cart which detaches into two frame parts forming an upper and lower portion when attached to a tree. The attachment to the tree is by upper and lower frame members on either side of the tree providing a friction engagement of the tree. There are adjustable positions along the frame for attaching a handle portion around the tree.

The Strickland patent, U.S. Pat No. 4,321,982 shows a cart having a platform with a chain attaching the platform to the tree and a handle portion of the cart for engaging one side of the tree above the platform, the length of the handle having an adjustment for engaging the tree.

The Briggs patent, U.S. Pat No. 3,353,379 has a platform with a chain for encircling a portion of the tree and a handle with a chain for encircling a second portion of the tree. The platform also has a brace, nailed to the tree, beneath the platform for support.

In all of the above examples the adjustments and attachments for securing the cart to the tree and for folding or assembling the cart into its various parts are cumbersome. The methods of attaching the tree stand to the tree do not result in a very stable tree stand. Once the tree stand is attached to the tree there are no adjustments for the height of the seat. Further the platforms of the tree stands described above are relatively small restricting the hunter's ability to use the tree stand.

SUMMARY OF THE INVENTION

The invention comprises a combination tree stand and game cart, which is easy to attach to a tree, is stable, provides a large platform to stand on and has an adjustable height seat. The combination tree stand and game cart is easy to configure from a cart to a tree stand and easy to attach to a tree. The cart handle is adjustable in length. The cart handle can be short for hauling the cart and supplies into the woods and lengthened to haul game and supplies out of the woods. The adjustable length handle also serves as an adjustable height seat, which can be adjusted after the tree stand is attached to a tree. The tree stand has a large platform for the hunter to climb onto and move around on. The hunter can adjust the height of the seat while on the platform. The seat also tilts for ease of dismounting or for the comfort of the user. The seat can also be positioned as a back rest.

The combination tree stand and game cart has a pair of detachable wheels which can be stored on the back on the tree stand frame so that the tires are between the tree and the tree stand when in use as a tree stand.

The wheel carriage is foldable so that it folds up underneath the platform when it is being used as a tree stand. Alternatively the wheel carriage can be removed entirely for a tree stand only mode of use.

The cart handle pivots on the cart frame to become a vertical frame member for supporting the seat and for securely attaching the tree stand to the tree. A pair of cables running from the platform frame to the handles when they are in the upright position provides support for the tree stand platform. Converting from the cart configuration to the tree stand configuration is accomplished by simply removing two pins from the arms, and connecting the cables on the tree stand platform.

Bars from the tree stand frame securely engage the tree for stability and a belt attached to the upper portion of the tree stand encompasses the tree and is pulled tight to secure the tree stand to a tree. A "T" screw can be used with the tree stand frame to ensure a stable position of the tree stand on the tree.

OBJECTS OF THE INVENTION

It is an object of the invention to wheel the tree stand through the woods as a cart for carrying articles and game.

It is an object of the invention to easily attach the tree stand to a tree at variably selected heights.

It is an object of the invention to easily adjust the height of the seat portion of the tree stand relative the platform for seat comfort.

It is an object of the invention to tilt or adjust the angle of the seat.

It is an object of the invention to provide a lightweight combination tree stand and game cart.

It is an object of the invention to provide a large platform to stand on in for the tree stand.

It is an object of the invention to use the cart handle as an adjustable extension to adjust out for game length when used as a game cart.

It is an object of the invention to simply, quickly and easily convert the cart to a tree stand.

It is an object of the invention to carry the tree stand into the woods like a backpack with straps attached to the tree stand.

Other objects, advantages and novel features of the present invention will become apparent from the following detailed description of the invention when considered in conjunction with the accompanying drawing.

DESCRIPTION OF THE PREFERRED EMBODIMENTS

Figure 1:
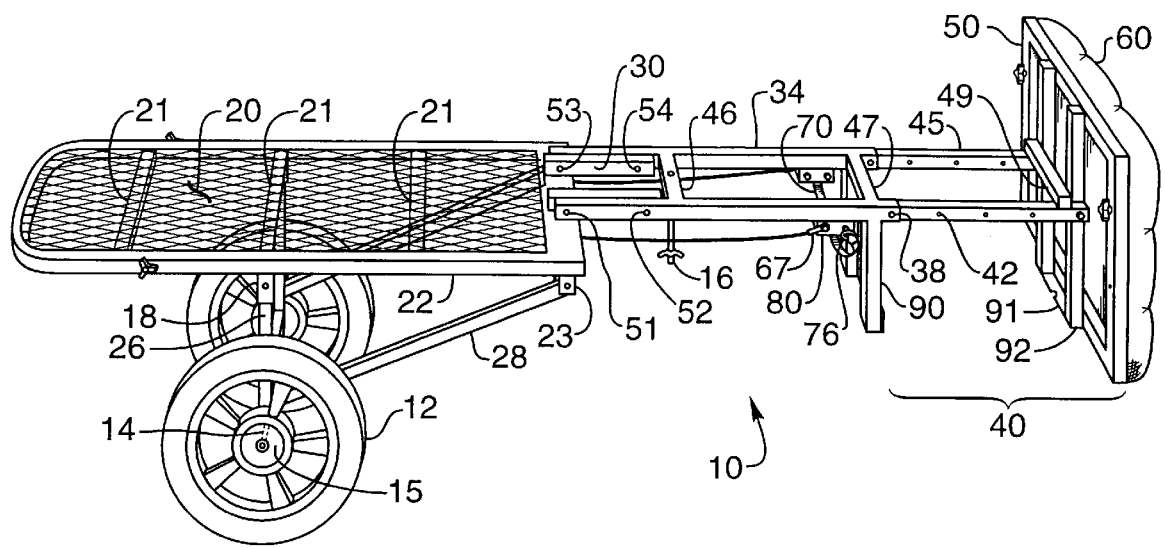
FIG. 1 is a perspective view of the combination tree stand and game cart in the game cart configuration.

Hunters, particularly deer hunters, use tree stands while hunting. Once a deer is killed the hunter has the problem of hauling the deer out of the woods. The hunter may, in addition to the tree stand, also have camping gear as well as hunting equipment to haul into the woods. Therefore it is convenient to have a cart, which converts to a tree stand. FIG. 1 shows a combination tree stand and game cart 10, in the cart configuration. The cart has a platform 20 for supporting objects to be hauled. The platform 20, as herein shown, has a metal mesh surface, however any type of surface may be used for the platform. The platform may be a plurality of spaced bars, a sheet of plywood, a web material or any other configuration for forming an article carrying surface.

The platform has a frame 22 having two sets of parallel frame members forming a generally rectangular shape. The frame 22 may have cross braces 21 for strengthening the frame. The frame 22 has a pair of wheel brackets 18, one on each side of the frame, for pivotally connecting leg members 26 to the frame 22. The leg members 26 have a wheel axel 14 extending therebetween for rotatingly supporting wheels 12. The wheels 12 are easily removed from the wheel axel 14 by use of wing knobs 15 which removably secure the wheels 12 to the wheel axel 14.

Figure 3:
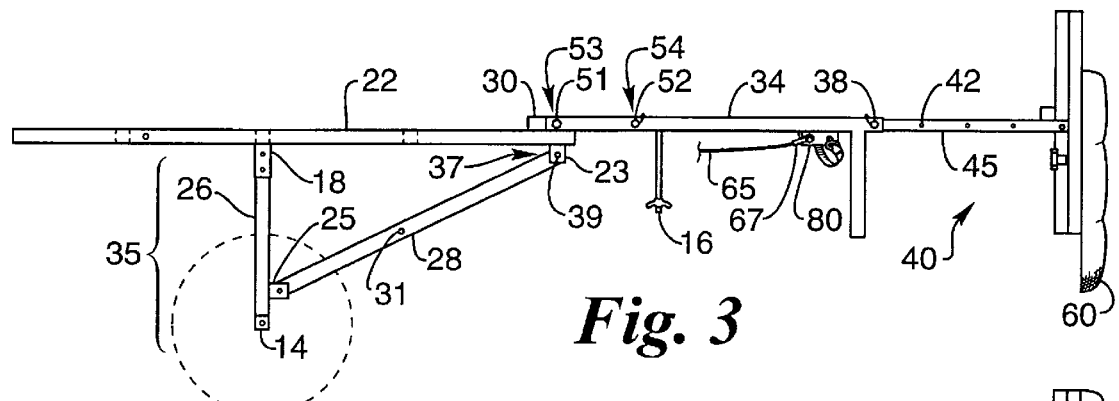
FIG. 3 is a side view of the frame of the cart with the wheel supports extended.
Figure 4:
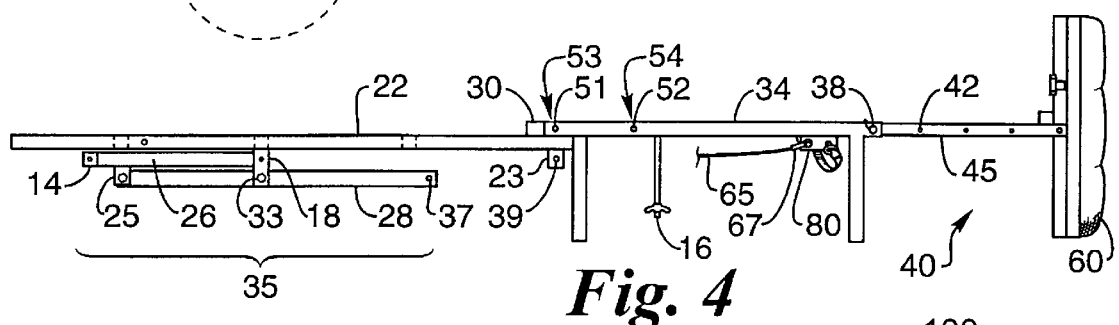
FIG. 4 is a side view of the frame of the cart with the wheel supports retracted.

As best seen in FIGS. 3 and 4, when the wheels 12 are on the cart 10 and the carriage 35 for the wheels 12 are extended for use as a cart, leg member 26 is braced so that it is perpendicular to frame 22 by brace member 28. Brace member 28 extends between a frame bracket 23, on frame 22, and a leg bracket 25 on leg 26. The brace member 28 is pivotably connected to leg bracket 25. When the brace member 28 is disconnected, by removing a pin (not shown) from apertures 37 and 39, in the brace member 28 and the frame bracket 23 respectively, the leg member 26 can be folded backward against the frame 22 as shown in FIG. 4, by pivoting in bracket 18 to fold the wheel carriage 35 underneath the frame 22. With the wheel carriage 35 folded up the platform 20 on frame 22 can be used as a step or platform on the tree stand.

Brace 28 is held in place when folded up by a pin extending through aperture 31 in brace member 31 and aperture 33 in wheel bracket 18.

Figure 2:
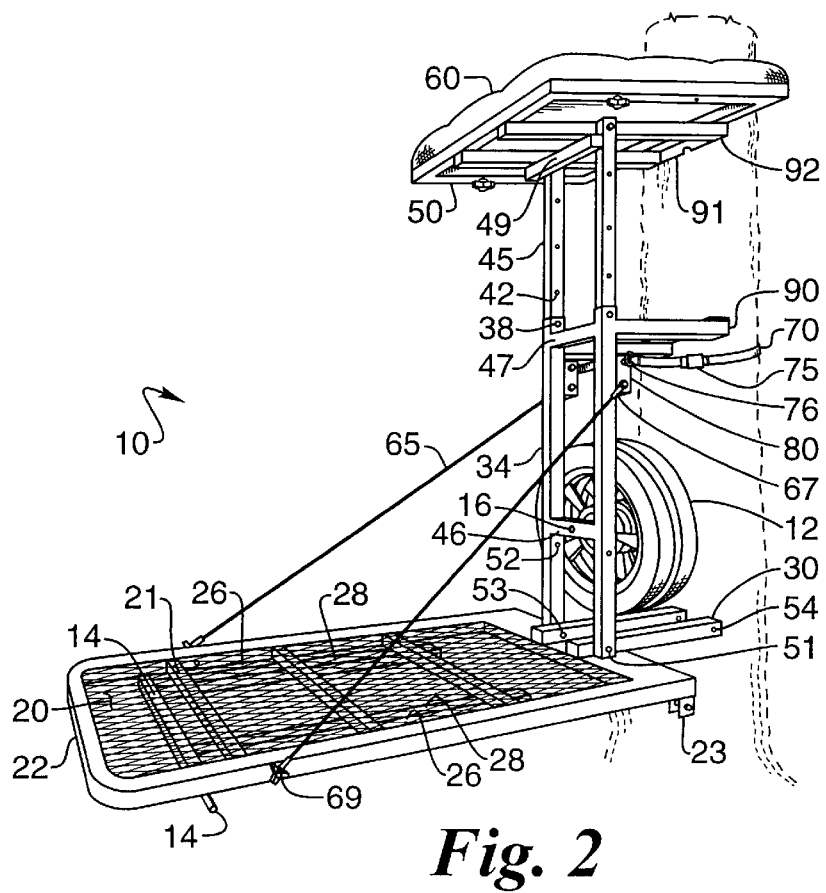
FIG. 2 is a perspective view of the combination tree stand and game cart in the tree stand configuration.

As best seen in FIGS. 1 and 2 bars 30 are attached to the frame 20 for securing arms 34 to the cart 10. The arms 34 and the attached seat structure 40 are used as cart handles for pushing or pulling the cart when the combination tree stand and game cart 10 is in the cart configuration. The arms 34 are pivotably attached to the bars 30 by bolts through apertures 51 and 53 in the arms 34 and the bars 30 respectively. The arms 34 can pivot with respect to the bars 30 when pins through apertures 52 and 54, in the arms 34 and bars 30 respectively, are removed.

The arms 34 support the seat structure 40 which is adjustably attached to the arms 34 by use of apertures 42 through tubes 45 and apertures 38 in arms 34 which are secured by pins (not shown) when the apertures 38 and 42 are aligned. When the arms 34 are parallel to the frame 22 the cart 10 has a handle for towing or pushing the cart. When the arms 34 are perpendicular to the cart the arms 34 support the seat structure 40 in the upright position for use as a tree stand. The length of the tubes 45 are easily adjusted by removing and replacing pins in the apertures 38 and 42. The seat structure 40 is extended to a longer setting for extra room when hauling game on the cart. The seat structure 40 can also be extended or lowered to adjust the height of the seat 60 on the tree stand.

The cart can be converted into a tree stand by removing the wheels 12, folding up the wheel carriage 35 and tilting the arms 34 ninety degrees to form an adjustable height seat support as well as becoming the vertical portion of the tree stand for attaching the tree stand to the tree.

Wheels 12 can be removed from wheel axel 14 by use of removable wing knobs 15. The wheels 12 can then be stored on wheel storage rod 16, which is attached to cross brace 46 between arms 34.

To tilt the arms 34 up 90 degrees, pins are removed from the apertures 52 on the arms 34 and apertures 54 on bars 30. Then arms 34 are pivoted on the bolts through apertures 51 and 53 on the arms 34 and bars 30 respectively. To prevent pivoting of the platform 20 by more than 90 degrees when there is a load thereon, cables 65 extend from the cable attachment 67, of belt bracket 80, on arm 34, to the cable attachment 69 on frame 22. The cable attachment 69 on the frame 22 is detachable from the frame to allow connection of the cables 65 only when the platform 20 is used in the tree stand mode. The platform 20 may be folded up against the arms 34 when in storage or when the tree stand is attached to the tree.

Figure 7:
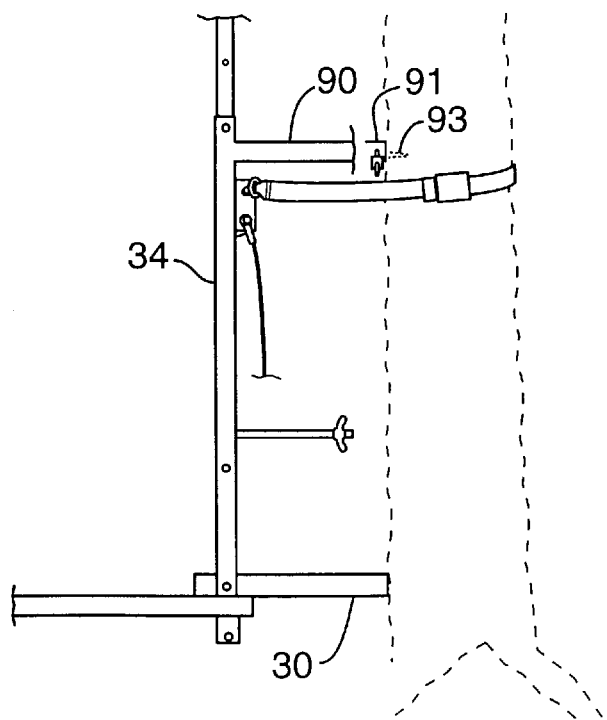
FIG. 7 is a side view of the tree engaging portion of the combination tree stand and game cart attached to a tree.

To attach the tree stand to a tree a "T" screw 93 as shown in FIG. 7 is preferably screwed into the tree at a desired height. Then the tree stand is hung on the "T" screw 93 by placing the "T" screw plate 91 onto the "T" screw 93. The "T" screw plate 91 is attached to between bars 90 on the tree stand. A belt 70 is then used to secure the tree stand to the tree.

Brackets 80 are attached to eye bolts 76 for attachment to the end of belt 70. The belt 70 has a buckle with a means for tightening the belt 70 around the tree. The means for tightening the belt 70 around the tree can be a one way mechanism in the buckle for adjusting and holding the length of the belt 70 at a length that secures the belt 70 to the tree. The means for tightening the belt 70 around the tree can also be by a come-a-long type ratchet.

Attachment bars 30 on frame 22 engage the outer perimeter of a tree and hold the platform 20 in a position extended a specified distance from the tree.

Cross brace 47 has tree engaging bars 90 attached for holding the tree stand 10 a specified distance from the tree. The engaging bars 90 have the "T" screw plate 91 extending therebetween. The engaging bars 90 can engage the perimeter of the tree and should be longer than the seat frame 50 such that there is enough space between the tree and the seat 60 to move the seat 60 up and down while belted to the tree.

The height of the seat 60 can be adjusted by sliding seat base tubes 45 inside of arms 34 and securing the seat base tubes in place by aligning one of a series of apertures 42 in the seat base tube 45 with aperture 38 in arm 34 and placing a bolt therethrough.

The seat structure 40 has seat base tubes 45 and a cross brace 49 near the top of the base tubes 45. As can be readily understood the base tubes 45 can be removed from the arms 34 and reinserted with the seat 60 rotated 180 degrees. Seat bars 92 are pivotally attached to the base tubes 45, at the center of seat bars 92, by bolts 85 such that the seat bars 92 rest on the top of cross brace 49 when the seat 60 is level. The cross brace 49 prevents the seat 60 from pivoting about bolts 85 past the cross brace 49 in one direction but allows tilting of the seat 60 in the opposite direction as shown by arrow 100 until the seat is parallel with the base tubes 45. The bolts 85 may have wing nuts or other tightening adjustments to lock the seat 60 in at a desired tilt angle. With this configuration the user can tilt the seat to a desired comfort position or tilt the seat down for easy dismounting. The seat base tubes 45 provide two parallel bars for pivotally engaging the seat bars 92 which support a seat frame 50. The seat frame 50 has four bars or tubes for forming a rectangle to support a seat cushion 60 thereon.

Figure 5:
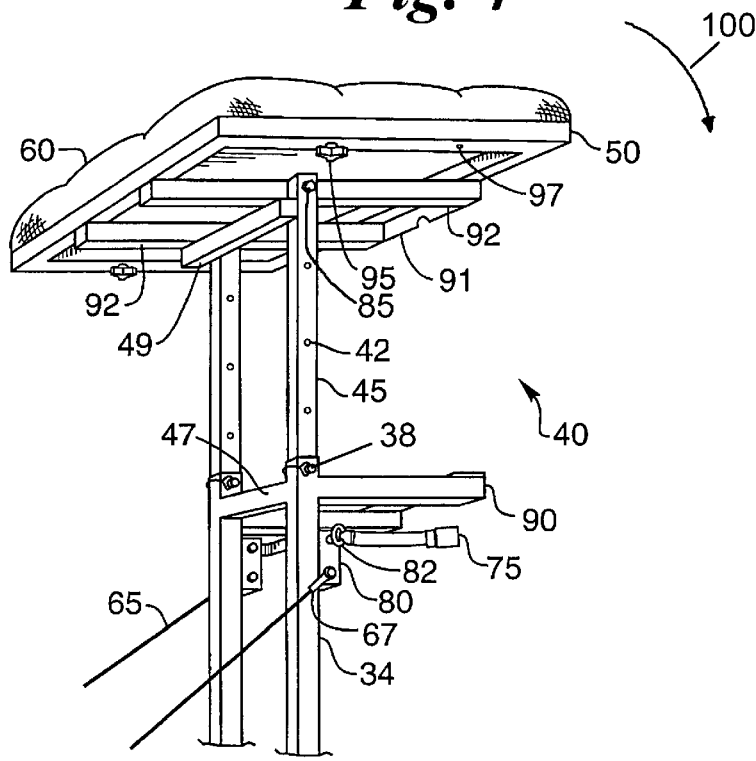
FIG. 5 is a perspective view of the seat portion of the combination tree stand and game cart.
Figure 6:
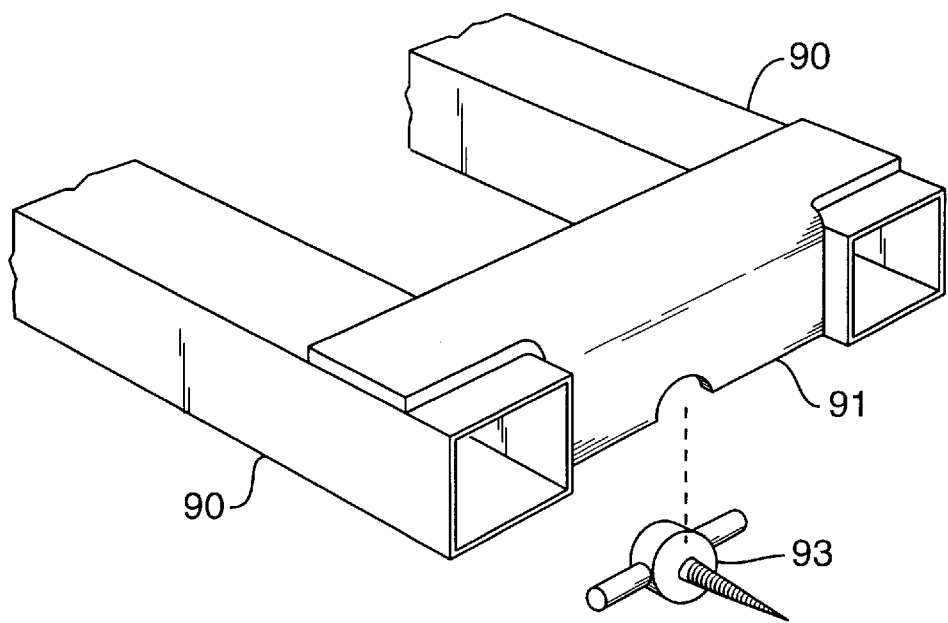
FIG. 6 is a back view of the tree engaging portion of the combination tree stand and game cart.

As best viewed in FIG. 5 the seat 60 is attached to the seat frame 50 by bolts extending through either apertures 95 or 97 on frame 50. Wing knobs can be used to quickly and easily secure bolts on the seat 60 extending through the apertures 95 or 97. When the seat is in the lowered position as in FIG. 3 apertures 97 are used for the seat 60. In this manner the seat 60 is out of the way of the top portion of the seat frame 50 so that it can be used as a handle when the combination deer cart and tree stand is in the cart mode. The seat can be moved to the position shown in FIGS. 4 and 5 for covering the seat frame 50 with the seat 60 for sitting on the seat 60 when the combination deer cart and tree stand is in the tree stand mode. Alternatively the seat 60 can be removed from the frame 50 when the combination deer cart and tree stand is in the deer cart mode.

The pins used in conjunction with the combination deer cart and tree stand are easy to remove and to secure in position. To secure the pins, safety snap pins, or similar devices preventing the removal of the pins are used. Some pins have attachments for securing the pins in place which are attached to the pins on one end and loop over the pins at the other end preventing the pins from coming out of the apertures they secure. Preferably most pins are attached to the frame by wire rope to prevent losing the pins.

In an alternative embodiment the tree stand can have straps on it for carrying the tree stand into the woods rather than wheeling it into the woods. The straps would enable the user to carry the tree stand like a backpack. If the tree stand is used solely in the backpack mode the wheel carriage 35 and wheels 12 maybe disconnected.

Obviously, many modifications and variations of the present invention are possible in light of the above teachings. It is therefore to be understood that, within the scope of the appended claims, the invention may be practiced otherwise than as specifically described.

What is claimed is:

1. A combination tree stand and game cart comprising:
    a frame for supporting a platform on which to transport articles,
    a foldable wheel carriage attached to the frame, the foldable wheel carriage having, a pair of legs pivotally attached to the frame, an axel extending between and attached to the pair of legs, a pair of detachable wheels removably connected to the axel, and a brace member pivotably attached to each leg and attached to the frame for supporting the axel in a fixed position and for detaching from the frame such that the foldable wheel carriage folds flat against the platform,
    a pair of arms pivotably attached to the frame for acting as a towing handle when secured parallel to the frame and for acting as a platform support when perpendicular to the platform,
    a seat attached to a seat frame, the seat frame supported by a pair of tubes, each tube adjustably attached to one of the pair of arms, such that the seat can be adjusted to change the distance between the platform and the seat,
    a belt having two ends with each end secured to one of the pair of arms, such that the belt can be drawn tight around a tree to secure the tree stand to a tree,
    a wheel storage bolt attached to a bar extending between the pair of arms for storage of the wheels thereon.

2. A combination tree stand and game cart as in claim 1 having,
    a first cable detachably connecting a first side of the frame to a first arm of the pair of arms attached to the frame and a second cable detachably connecting the second side of the frame to a second arm of the pair of arms attached to the frame to secure the platform in a position perpendicularly to the arms.

3. A combination tree stand and game cart as in claim 1 having,
    an upper pair of bars attached to the arms for engaging a tree and,
    a lower pair of bars attached to the frame for engaging a tree such that the upper and lower pairs of bars provide a distance between the tree and the tree stand such that the seat can be adjusted without hitting the tree trunk.

4. A combination tree stand and game cart as in claim 3 having,
    a belt attachment means attached to the first arm and a belt attachment means attached to the second arm, the belt attachment means located between top and bottom bars for securing the tree stand to a tree.

5. A combination tree stand and game cart as in claim 1 having,
    a belt tightening apparatus on the belt for securing the tree stand to a tree.

6. A combination tree stand and game cart as in claim 1 having,
    a T screw holdingly connected to a bar between the arms for securing the tree stand to a tree.

7. A combination tree stand and game cart as in claim 5 having,
    a T screw holdingly connected to a bar between the arms for securing the tree stand to a tree.

8. A combination tree stand and game cart comprising:
    a frame for supporting a platform on which to transport articles,
    a foldable wheel carriage attached to the frame, the foldable wheel carriage having, a pair of legs pivotally attached to the frame, an axel extending between and attached to the pair of legs, a pair of detachable wheels removably connected to the axel, and a brace member pivotably attached to each leg and attached to the frame for supporting the axel in a fixed position and for detaching from the frame such that the foldable wheel carriage folds flat against the platform,
    a pair of arms pivotably attached to the frame for acting as a towing handle when secured parallel to the frame and for acting as a platform support when perpendicular to the platform,
    a seat attached to a seat frame, the seat frame supported by a pair of tubes, each tube adjustably attached to one of the pair of arms, such that the seat can be adjusted to change the distance between the platform and the seat, a belt having two ends with each end secured to one of the pair of arms, such that the belt can be drawn tight around a tree to secure the tree stand to a tree, a pin through an aperture in each arm secures the pair of arms parallel to the frame, such that the removal of the pins allows the pair of arms to move perpendicular to the frame for easily converting the combination tree stand and game cart from a cart configuration to a tree stand configuration.

9. A combination tree stand and game cart as in claim 8 having, a first cable detachably connecting a first side of the frame to a first arm of the pair of arms attached to the frame and a second cable detachably connecting the second side of the frame to a second arm of the pair of arms attached to the frame to secure the platform in a position perpendicularly to the arms.

10. A combination tree stand and game cart as in claim 8 having, an upper pair of bars attached to the arms for engaging a tree and, a lower pair of bars attached to the frame for engaging a tree such that the upper and lower pairs of bars provide a distance between the tree and the tree stand such that the seat can be adjusted without hitting the tree trunk.

11. A combination tree stand and game cart as in claim 10 having, a belt attachment means attached to the first arm and a belt attachment means attached to the second arm, the belt attachment means located between top and bottom bars for securing the tree stand to a tree.

12. A combination tree stand and game cart as in claim 8 having, a belt tightening apparatus on the belt for securing the tree stand to a tree.

13. A combination tree stand and game cart as in claim 8 having, a T screw holdingly connected to a bar between the arms for securing the tree stand to a tree.

14. A combination tree stand and game cart as in claim 12 having, a T screw holdingly connected to a bar between the arms for securing the tree stand to a tree.

15. A combination tree stand and game cart as in claim 1 having, the seat frame pivotally attached to the pair of tubes to tilt the seat frame relative to the pair of tubes such that the seat tilts to different angles.

16. A combination tree stand and game cart as in claim 7 having, the seat frame pivotally attached to the pair of tubes to tilt the seat frame relative to the pair of tubes such that the seat tilts to different angles.

17. A combination tree stand and game cart comprising:

a frame for supporting a platform on which to transport articles, a pair of arms pivotably attached to the frame for acting as a platform support when perpendicular to the platform, a seat pivotally attached to a seat frame, the seat frame supported by a pair of tubes, each tube adjustably attached to one of the pair of arms, such that the seat can be adjusted to change the distance between the platform and the seat, and the seat frame can be pivotally angled to different positions relative to the pair of arms, a belt having two ends with each end secured to one of the pair of arms, such that the belt can be drawn tight around a tree to secure the tree stand to a tree, a pin through an aperture in each arm secures the pair of arms parallel to the frame, such that the removal of the pins allows the pair of arms to move perpendicular to the frame for easily converting the combination tree stand and game cart from a cart configuration to a tree stand configuration.

18. A combination tree stand and game cart as in claim 17 having, a first cable detachably connecting a first side of the frame to a first arm of the pair of arms attached to the frame and a second cable detachably connecting the second side of the frame to a second arm of the pair of arms attached to the frame to secure the platform in a position perpendicularly to the arms.

19. A combination tree stand and game cart as in claim 17 having, an upper pair of bars attached to the arms for engaging a tree and, a lower pair of bars attached to the frame for engaging a tree such that the upper and lower pairs of bars provide a distance between the tree and the tree stand such that the seat can be adjusted without hitting the tree trunk.

20. A combination tree stand and game cart as in claim 19 having, a belt attachment means attached to the first arm and a belt attachment means attached to the second arm, the belt attachment means located between top and bottom bars for securing the tree stand to a tree.

* * * * *